(12) United States Patent
Motoyama et al.

(10) Patent No.: US 6,835,427 B2
(45) Date of Patent: Dec. 28, 2004

(54) OPTICALLY ACTIVE COMPOUND AND LIQUID CRYSTAL COMPOSITION CONTAINING THE COMPOUND

(75) Inventors: Yuki Motoyama, Katsushika-ku (JP); Takakiyo Mine, Katsushika-ku (JP); Masahiro Johno, Katsushika-ku (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 10/780,705

(22) Filed: Feb. 19, 2004

(65) Prior Publication Data

US 2004/0164273 A1 Aug. 26, 2004

(30) Foreign Application Priority Data

Feb. 21, 2003 (JP) .......................... 2003-043853

(51) Int. Cl.[7] .................. C09K 19/58; C07C 69/78; C07C 69/76

(52) U.S. Cl. .................. 428/1.1; 252/299.2; 252/299.5; 560/56; 560/80; 560/100

(58) Field of Search .................. 428/1.1; 252/299.2, 252/299.5; 560/56, 80, 100

(56) References Cited

U.S. PATENT DOCUMENTS 6,699,532 B2   3/2004   Motoyama et al. .......... 428/1.1

FOREIGN PATENT DOCUMENTS

| JP | 62-081354 | 4/1987 |
|----|-----------|--------|
| JP | 2002-179669 | 6/2002 |
| WO | 02/34739 | 5/2002 |

OTHER PUBLICATIONS

CAPLUS 1989: 457224.*

H. J. Deuben et al., "New 6,6'–Disubstituted–Binaphthol Derivatives as Chiral Dopants: Synthesis and Temperature Dependence of Molecular Conformations", Liquid Crystals, 1996, vol. 21, No. 3, pp. 327–340.

* cited by examiner

Primary Examiner—Shean C. Wu
(74) Attorney, Agent, or Firm—Wenderoth, Lind & Ponack, L.L.P.

(57) ABSTRACT

An optically active compound containing 5,5',6,6',7,7',8,8'-octahydro-1,1'-bi-2-naphthol of the general formula (1) as an asymmetric source,

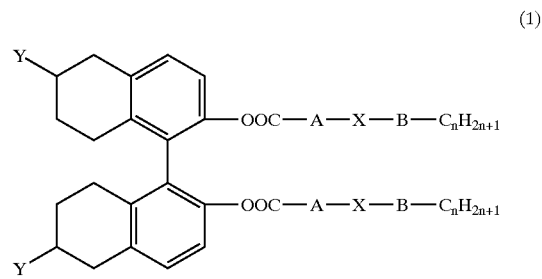

(1)

wherein n is an integer of 1 to 10, Y is a hydrogen atom, an alkyl group having 1 to 5 carbon atoms, a phenyl group, a phenyl group substituted with an alkyl group having 1 to 5 carbon atoms or a phenyl group substituted with an alkoxy group having 1 to 4 carbon atoms, X is a single bond (—), —OOC— or —OCH$_2$—, and each of A and B is a substituent formed by specifically combining rings selected from cyclohexane, benzene, pyrimidine, naphthalene, dioxane, etc., including mutual bonding forms of rings so that the substituent has 1 to 4 rings, the optically active compound characteristically having a large helical twisting power (HTP) of 50 or more and being useful as a chiral dopant, the chiral dopant being capable of adjusting a helical pitch when only added in a small amount, so that the deterioration of performances of a base liquid crystal can be prevented.

11 Claims, 1 Drawing Sheet

OPTICALLY ACTIVE COMPOUND AND LIQUID CRYSTAL COMPOSITION CONTAINING THE COMPOUND

DETAILED DESCRIPTION OF THE INVENTION

Field of the Invention

The present invention relates to a novel optically active compound useful as a chiral dopant, a liquid crystal composition containing the compound, and a liquid crystal display device to which the liquid crystal composition is applied. More specifically, it relates to a chiral dopant having a helical twisting power (to be called "HTP" for short) of at least 50 and a use thereof.

Various modes are known as display modes of liquid crystal display devices, and in most of such display modes, it is required to control the helical pitch of a liquid crystal. The mode that requires the control of the helical pitch of a liquid crystal includes the following modes. The modes that have been practically and widely used are a twisted nematic mode (TN mode) and a super twisted nematic mode (STN mode) both using a nematic liquid crystal.

In the TN mode, liquid crystal molecules are aligned so as to twist 90 degrees between an upper substrate and a lower substrate, and a ¼ pitch of a helix is formed in a cell.

In the STN mode, liquid crystal molecules are aligned so as to twist approximately 220 degrees between an upper substrate and a lower substrate, and an approximately ⅗ pitch of a helix is formed in a cell.

The TN mode is employed in a simple matrix driving liquid crystal display device and an active matrix driving liquid crystal display device, and the STN mode is employed in a simple matrix driving liquid crystal display device.

Figure 1:
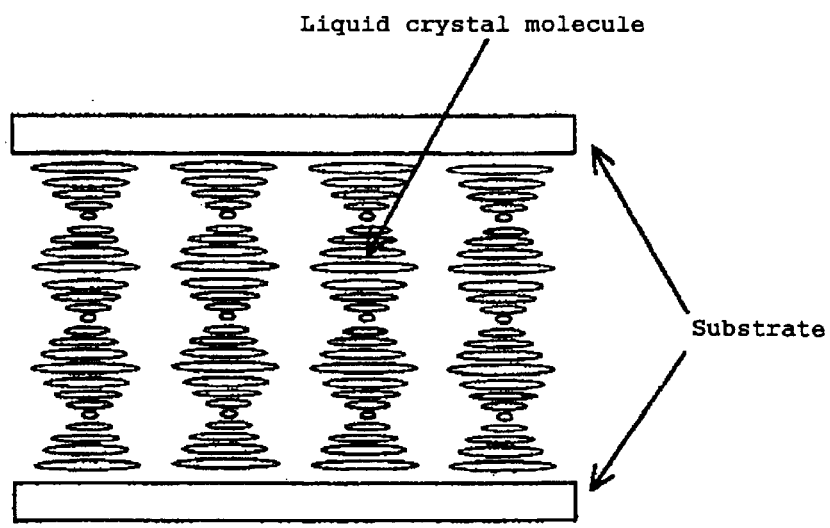
FIG. 1 is a schematic drawing showing a planar alignment state of a chiral nematic liquid crystal.
Figure 2:
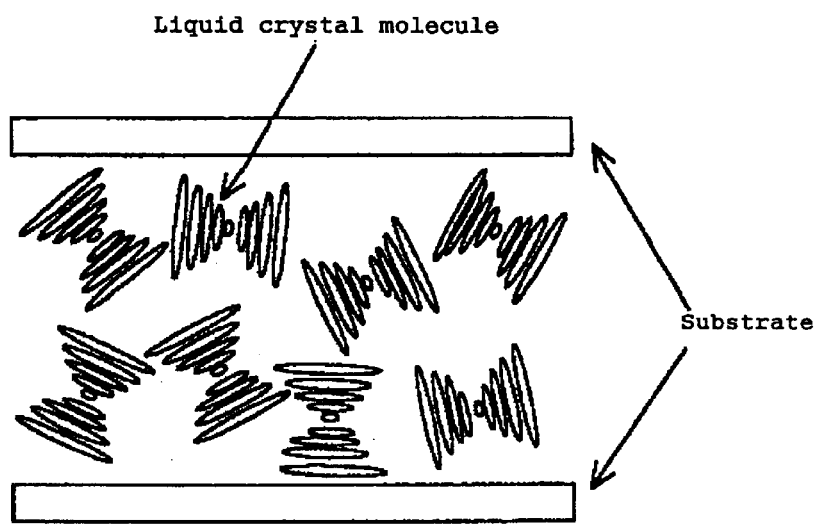
FIG. 2 is a schematic drawing showing a focal-conic alignment state of a chiral nematic liquid crystal.

Further, there is also a selective reflection (SR) mode of a chiral nematic liquid crystal as another mode in addition to the above TN mode and STN mode. In the SR mode, as shown in FIGS. 1 and 2, a liquid crystal has a planar alignment state in which helical axes are perpendicular to substrates (FIG. 1) and a focal-conic alignment state in which directions of helical axes are at random (FIG. 2). These two states are switched from one to the other with voltage pulse. In the planar alignment state, light having a wavelength corresponding to a helical pitch is reflected, and in the focal-conic alignment state, light is transmitted through a device. When a reflection state is used as "bright" and when a transmission state is used as "dark", a display can be materialized.

An optically active compound that induces a helical structure is generally called "chiral dopant". Many chiral dopants have been synthesized, and typical compounds thereof are compounds having the following structures.

| Name | Structural formula |
|---|---|
| S811: | $C_6H_{13}O-$⟨⟩$-COO-$⟨⟩$-COOC^*HC_6H_{13}$ with $CH_3$ |
| CB15: | $NC-$⟨⟩$-$⟨⟩$-CH_2C^*HC_2H_5$ with $CH_3$ |
| CN: | cholesteryl structure with $C_8H_{17}COO$ |

The most essential performance that is required of a chiral dopant is to have a large helical twisting power (HTP). HTP refers to a physical quantity defined by the following expression.

$HTP\ (\mu m^{-1})=1/(\text{amount of chiral dopant added (wt \%)}/100\times\text{induced helical pitch }(\mu m))$ Generally, chiral dopants themselves exhibit no liquid crystallinity, and most of them have large molecular weights. When a large amount of a chiral dopant is added to a base liquid crystal, it degrades various performances in many cases. The degradation of the performances includes a decrease in temperature for phase transition from an isotropic phase to a nematic phase, an increase in viscosity of a liquid crystal and an easy occurrence of crystallization. A chiral dopant having large HTP serves to prevent the degradation of the various performances, since a desired helical pitch can be obtained by adding a small amount of such a chiral dopant to the base liquid crystal. The above known chiral dopants have small HTP. It is therefore desired to develop a chiral dopant that exhibits greater HTP.

In the present specification, a "liquid crystal" means a composition containing a plurality of liquid crystal compounds unless it is specified to be a specific compound. Further, a "chiral dopant" means an optically active compound that induces a helical structure or a mixture of such compounds. Further, a "basic liquid crystal" means a nematic liquid crystal containing no chiral dopant.

Problems to be Solved by the Invention

It is an object of the present invention to provide a chiral dopant having a remarkably large HTP of as large as 50 or more.

JP-A-62-81354 to Heppke et al teaches nine chiral dopant compounds containing 1,1'-bi-2-naphthol as an optically active portion, and of these compounds, five compounds exhibit large HTP values. Some of the present inventors made studies for developments of chiral dopant compounds containing 1,1'-bi-2-naphthol as an optically active portion and found compounds having HTP values of 50 or more (U.S. Ser. No. 10/461,462). The compounds taught by Heppke et al and the compounds developed by some of the present inventors exhibit an effect on prevention of performance degradations such as a decrease in phase transfer temperature from an isotropic phase to a nematic phase, an increase in the viscosity of a crystal and easy crystallization.

In addition to the above compounds, compounds containing 1,1'-bi-2-naphthol as an optically active portion and having crosslinked hydroxyl portions at the 2,2'-positions of the 1,1'-bi-2-naphthol have been proposed as chiral dopant compounds having HTP values of 50 or more. Of these compounds, three compounds out of 6 compounds disclosed by H.-J. DEUSSEN, et al in LIQUID CRYSTALS, Vol. 21, No. 3, page 327 (1996), two compounds out of 25 compounds disclosed by Yumoto et al in JP-A-2002-179669 and two compounds out of 6 compounds disclosed by HECKMEIYER et al in International Publication WO 02/34739 exhibit HTP values of 50 or more as chiral dopant compounds.

Various developments are being actively made for chiral dopants having HTP values of 50 or more, while the number of such compounds is limited, and when it is taken into account to apply such compounds to various applications, it is required to increase chiral dopants in types.

Means to Solve the Problems

The present inventors have made diligent studies in various ways and found that an optically active compound containing 5,5',6,6',7,7',8,8'-octahydro-1,1'-bi-2-naphthol or a derivative thereof as an asymmetric source exhibits a remarkably large HTP value of 50 or more, and the present invention has been accordingly completed.

That is, according to the present invention, there is provided an optically active compound of the general formula (1),

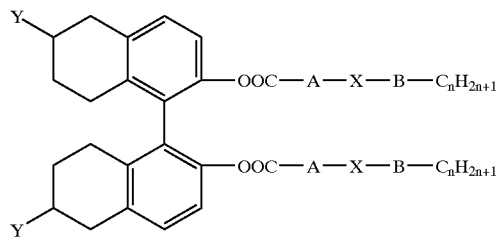
(1)

wherein n is an integer of 1 to 10, Y is a hydrogen atom, an alkyl group having 1 to 5 carbon atoms, a phenyl group, a phenyl group substituted with an alkyl group having 0.1 to 5 carbon atoms or a phenyl group substituted with an alkoxy group having 1 to 4 carbon atoms, X is a single bond (—), —OOC— or —OCH$_2$—, and each of A and B represents a group or a bond defined in the following (1) to (3), (1) when X is a single bond (—), A is -Cy-, -Ph-, -Py- or -Np-, and when A is -Cy-, B is a single bond, -Cy- or -Ph-Z-, when A is -Ph-, B is a single bond, —O—, -Cy-, -Ph-Z-, -Pyr-Z-, -Di-, -Ph-Cy-, -Ph-Ph-Z-, -Ph-Pyr-Z- or -Pyr-Ph-Z-, when A is -Py-, B is -Ph-Z-, or when A is -Np-, B is a single bond or —O—, (2) when X is —OOC—, A is -Ph-, -Np- or -Ph-Ph-, and when A is -Ph-, B is -Cy-, -Ph-Z-, —Np-Z-, -Cy-Cy-, -Py-Ph-Z-, -Ph-Cy-, -Ph-Ph-Z-, -Ph-Di-, -Ph-Pyr-Z-, -Cy-Ph-Z-, -Ph-OOC-Cy- or -Ph-OOC-Ph-Z-, or when A is -Np- or -Ph-Ph-, B is -Cy- or -Ph-Z-, and (3) when X is —OCH$_2$—, A is -Ph-, -Np- or -Ph-Ph-, and when A is -Ph-, B is -Cy-, -Ph-Z-, —Np-Z-, -Cy-Cy-, -Py-Ph-Z-, -Ph-Cy-, -Ph-Ph-Z-, -Ph-Di- or -Ph-Pyr-Z-, or when A is —Np- or -Ph-Ph-, B is -Cy- or -Ph-Z-, in which Z is a single bond (—) or —O—, and -Ph-, -Cy-, —OOC—, -Py-, -Pyr-, -Di- and -Np- represent the following structures, provided that one hydrogen atom of -Ph- may be replaced with methyl, a fluorine atom or a chlorine atom.

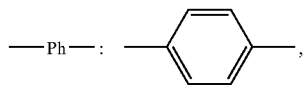

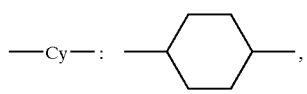

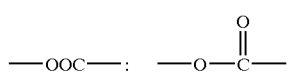

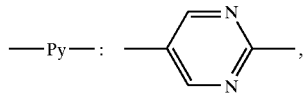

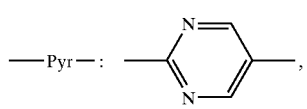

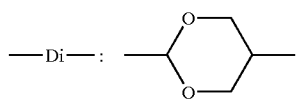

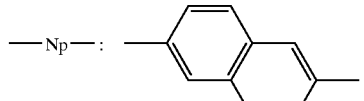

The optically active compound of the present invention is desirably an optically active compound of the above general formula (1) in which Y is a hydrogen atom, or desirably an optically active compound of the above general formula (1) in which n is an integer of 3 to 8. It is also desirably an optically active compound of the general formula (1) in which X is a single bond (—) or —OOC—.

Further, the optically active compound of the present invention is preferably an optically active compound of the above general formula (1) in which A is -Ph-, and it is also preferably an optically active compound of the above general formula (1) in which B is -Ph-Z-, -Cy-, -Di-, —O— or -Ph-Cy-.

The optically active compound of the present invention desirably has a helical twisting power (HTP) of 50 or more. The optically active compound of the present invention is suitably used as a chiral dopant for a nematic liquid crystal and is suitably used in the form of a nematic liquid crystal composition containing at least one compound of the general formula (1), and the nematic liquid crystal composition is advantageously used in a liquid crystal display device to be interposed between substrates having electrodes.

The optically active compound of the present invention includes an R-configuration compound and an S-configuration compound, and any one of these can be suitably used. That is, the R-configuration compound and the S-configuration compound differ from each other in twisting direction (right-handed twisting or left-handed twisting) of the helical structure induced. These compounds are therefore selected by taking account of the twisting direction of a chiral dopant to be used in combination.

The optically active compound of the present invention has excellent compatibility with a nematic liquid crystal as a base liquid crystal and does not easily cause crystallization. However, when a large amount of the optically active compound of the present invention is solely added to a nematic liquid crystal, the resultant composition having some combination may undergo crystallization at room temperature. In this case, however, the crystallization can be easily avoided by using other chiral dopant in combination.

When the optically active compound of the present invention is used as a chiral dopant, the amount of the optically active compound based on the nematic liquid crystal composition containing the optically active compound is generally in the range of 0.1 to 20% by weight, preferably 0.1 to 10% by weight. The above amount ratio is determined to be in the above range on the basis of values of HTP and crystallinity of the optically active compound and a type of a nematic liquid crystal.

The helical pitch has the property of easily undergoing a change depending upon temperatures. Since a change in helical pitch has influences on various performances, it is desirable that a change in helical pitch depending upon temperature should be as small as possible in the display modes as described above.

In the SR mode in particular, a liquid crystal reflects (selectively reflects) light corresponding to a helical pitch to generate a bright state. However, when chiral dopants that have been already developed are used, the helical pitch increases in length with an increase in temperature, so that there is caused a critical problem that the color of reflected light shifts toward a long wavelength side.

A change in wavelength of selectively reflected light with an increase in temperature will be referred to as "wavelength shift". An increase in wavelength of selectively reflected light caused by an increase in temperature is defined to be plus wavelength shift, and a decrease in wavelength of selectively reflected light is defined to be minus wavelength shift.

As a method for removing the dependency of wavelength of selectively reflected light upon temperatures, there is a method in which a chiral dopant that shows a plus wavelength shift and a chiral dopant that shows a minus wavelength shift are used in combination.

In the present invention, both a chiral dopant that shows a plus wavelength shift and a chiral dopant that shows a minus wavelength shift can be obtained by changing A, B and X in the general formula (1). Therefore, wavelength shifts of chiral dopants to be combined are taken into account, and optically active compounds of the present invention are selected as required, whereby there can be obtained a liquid crystal composition that shows little dependency of the wavelength of selectively reflected light on temperatures.

Effect of the Invention

The present invention provides a chiral dopant having a property that the HTP is remarkably large, as large as 50 or more.

In liquid crystals for use in TN mode, STN mode or SR mode, therefore, the helical pitch can be adjusted by only adding a small amount of the chiral dopant of the present invention, so that the degradation of performances of a base liquid crystal can be suppressed.

EXAMPLES

The present invention will be explained in detail with reference to Examples and Comparative Example hereinafter, while the present invention shall not be limited thereto.

Example 1

(Formula (1): n=4, X=—, Y=H, A=-Ph-, B=-Cy- (E1)) Preparation of 4-(trans-4-n-butylcyclohexyl)benzoic acid-(R)-5,5',6,6',7,7',8,8'-octahydro-1,1'-bi-2-naphthol diester:

0.50 Gram (0.0017 mol) of (R)-(+)-5,5',6,6',7,7',8,8'-octahydro-1,1'-bi-2-naphthol and 0.88 g (0.0034 mol) of 4-(trans-4-n-butylcyclohexyl)benzoic acid were placed in an eggplant type flask and dissolved in 25 mL (milliliters) of dichloromethane. To the mixture were added 0.77 g (0.0037 mol) of dicyclohexylcarbodiimide (DCC) and 0.33 g (0.0027 mol) of dimethylaminopyridine (DMAP), and the mixture was stirred at room temperature for 1 day.

A precipitated solid was separated by filtration, and an organic layer was washed with 2N hydrochloric acid and water and dried over anhydrous magnesium sulfate.

The solvent was distilled off under reduced pressure, and then, a residue was purified by silica gel column chromatography to give 0.74 g (yield 56%) of an end compound.

Examples 2 to 4

(Formula (1): n=5, X=—, Y=H, A=-Ph-, B=-Ph- (E2)), Preparation of 4'-n-pentylbiphenyl-4-carboxylic acid-(R)-5,5',6,6',7,7',8,8'-octahydro-1,1'-bi-2-naphthol diester;

(Formula (1): n=8, X=—, Y=H, A=-Ph-, B=-Di- (E3)), Preparation of 4-(5-n-octyl-1,3-dioxan-2-yl)benzoic acid-(R)-5,5',6,6',7,7',8,8'-octahydro-1,1'-bi-2-naphthol diester; and (Formula (1): n=6, X=—, Y=H, A=-Ph-, B=—O— (E4)), Preparation of 4-n-hexyloxybenzoic acid-(R)-5,5',6,6',7,7',8,8'-octahydro-1,1'-bi-2-naphthol diester:

An end compound was obtained in the same manner as in Example 1 except that the 4-(trans-4-n-butylcyclohexyl) benzoic acid was replaced with 4'-n-pentylbiphenyl-4-carboxylic acid, 4-(5-n-octyl-1,3-dioxan-2-yl)benzoic acid or 4-n-hexyloxybenzoic acid.

Example 5

(Formula (1): n=6, X=—OOC—, Y=H, A=-Ph-, B=-Ph-Cy- (E5)), Preparation of 4-(trans-4-n-hexylcyclohexyl) benzoic acid-[5,5',6,6',7,7',8,8'-octahydro-1,1'-bi-2-naphthalene]-2,2'-diylbis(oxycarbonyl-4,1-phenylene) ester (1) Synthesis of 4-acetoxybenzoic acid-[5,5',6,6',7,7',8,8'-octahydro-1,1'-bi-2-naphthalene]-2,2'-diyl ester 5.0 Grams (0.017 mol) of (R)-(+)-5,5',6,6',7,7',8,8'-octahydro-1,1'-bi-2-naphthol and 11.1 g (0.056 mol) of 4-acetoxybenzoyl chloride were placed in an eggplant-type flask, and dissolved in 150 mL of dichloromethane. To the resultant solution was added 4.4 g (0.056 mol) of pyridine, and the mixture was stirred at room temperature for 1 day.

To the reaction solution was added 50 mL of water, and the mixture was stirred for 30 minutes. Then, 2N hydrochloric acid was added, to separate the mixture into an organic layer and an aqueous layer. The organic layer was washed with water and dried over anhydrous magnesium sulfate. The solvent was distilled off under reduced pressure to give 9.8 g (0.016 mol) of an end compound.

(2) Synthesis of 4-hydroxybenzoic acid-[5,5',6,6',7,7',8,8'-octahydro-1,1'-bi-2-naphthalene]-2,2'-diyl ester 9.8 Grams (0.016 mol) of 4-acetoxybenzoic acid-[5,5',6,6',7,7',8,8'-octahydro-1,1'-bi-2-naphthalene]-2,2'-diyl ester was placed in an eggplant-type flask and dissolved in 50 mL of toluene. To the resultant solution was added 4.9 g (0.063 mol) of a solution of 40 wt % methylamine in methanol, and the mixture was stirred at room temperature for 5 hours.

2N hydrochloric acid was added to the reaction solution, to separate the solution into an organic layer and an aqueous layer.

The organic layer was washed with water and dried over anhydrous magnesium sulfate, and then the solvent was distilled off under reduced pressure, to give 7.2 g (yield 85%) of an end compound.

(3) Synthesis of 4-(trans-4-n-hexylcyclohexyl)benzoic acid-[5,5',6,6',7,7',8,8'-octahydro-1,1'-bi-2-naphthalene]-2, 2'-diylbis(oxycarbonyl-4,1-phenylene)ester 1.0 Gram (0.0019 mol) of 4-hydroxybenzoic acid-[(R)-5, 5',6,6',7,7',8,8'-octahydro-1,1'-bi-2-naphthalene]-2,2'-diyl ester and 1.1 g (0.0037 mol) of 4-(trans-n-hexylcyclohexyl) benzoic acid were placed in an eggplant-type flask, and dissolved in 40 mL of dichloromethane. To the resultant mixture were added 0.92 g (0.0045 mol) of DCC and 0.18 g (0.0015 mol) of DMAP, and the mixture was stirred at room temperature for 1 day. A precipitated solid was separated by filtration, and an organic layer was washed with 2N hydrochloric acid and water and dried over anhydrous magnesium sulfate. Then, the solvent was distilled off under reduced pressure, to give a crude product.

The thus-obtained crude product was purified by silica gel column chromatography, to give 1.5 g (yield 74%) of an end compound.

Examples 6 and 7

(Formula (1): n=6, X=—OOC—, Y=H, A=-Ph-, B=-Ph-O— (E6)), Preparation of 4-n-hexyloxybenzoic acid-[5,5', 6,6',7,7',8,8'-octahydro-1,1'-bi-2-naphthalene]-2,2'-diylbis (oxycarbonyl-4,1-phenylene) ester, and (Formula (1): n=5, X=—OOC—, Y=H, A=-Ph-, B=-Cy- (E7)), Preparation of trans-4-n-pentylcyclohexanecarboxylic acid-[5,5',6,6',7,7',8,8'-octahydro-1,1'-bi-2-naphthalene]-2,2'-diylbis(oxycarbonyl-4,1-phenylene) ester.

An end compound was obtained in the same manner as in Example 5 except that the 4-(trans-n-hexylcyclohexyl) benzoic acid in (3) of Example 5 was replaced with 4-n-hexyloxybenzoic acid or trans-4-n-pencylcyclohexanecarboxylic acid.

The above-obtained compounds (E1 to E7) were measured for thermal properties by DSC (temperature elevation), and the results were as shown below.

E1(42), E2(33), E3(12), E4(1), E5(46), E6(26), E7(26)

A parenthesized value shows a melting point or glass transition temperature (° C.). It was not clearly found whether the compounds E1 to E7 were in a crystal state or a glass state at room temperature.

Structural formulae of the optically active compounds (E1 to E7) are shown below, and Tables 1 and 2 show $^1$H-NMR measurement results thereof.

[Common portion]

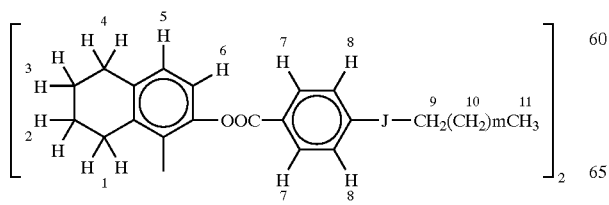

[J portion]

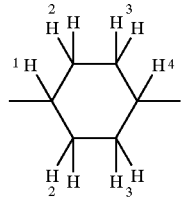

E1

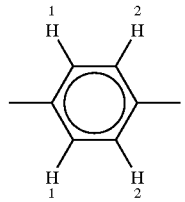

E2

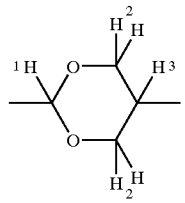

E3

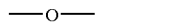

E4

—O—

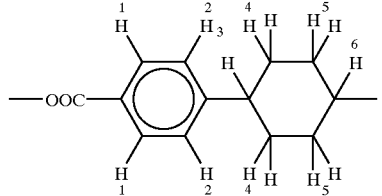

E5

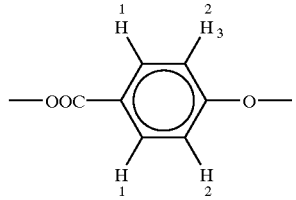

E6

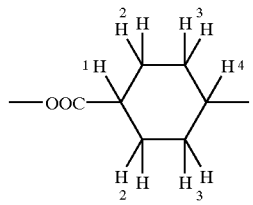

E7

TABLE 1

| | Common portion δ (1H) ppm | | | | | | | | | | |
|---|---|---|---|---|---|---|---|---|---|---|---|
| | 1 | 2 | 3 | 4 | 5 | 6 | 7 | 8 | 9 | 10 | 11 |
| E1 | ← 1.02–2.80 → | | | | 7.06 | 7.06 | 7.70 | 7.21 | ← 1.02–1.87 → | | 0.94 |
| E2 | ← 1.34–2.81 → | | | | 7.10 | 7.10 | 7.84 | 7.54 | ← 1.34–2.81 → | | 0.90 |
| E3 | ← 1.08–2.78 → | | | | 7.05 | 7.05 | 7.77 | 7.45 | ← 1.08–1.72 → | | 0.89 |
| E4 | ← 1.31–2.79 → | | | | 7.06 | 7.06 | 7.71 | 6.80 | 3.97 | 1.31–1.81 | 0.91 |
| E5 | ← 1.03–2.82 → | | | | 7.09 | 7.09 | 8.09 | 7.34 | ← 1.03–1.91 → | | 0.90 |
| E6 | ← 1.34–2.82 → | | | | 7.10 | 7.10 | 8.12 | 7.21 | 4.05 | 1.34–1.86 | 0.92 |
| E7 | ← 0.98–2.80 → | | | | 7.06 | 7.06 | 7.79 | 7.06 | ← 0.98–2.13 → | | 0.90 |

TABLE 2

| | J portion δ (1H) ppm | | | | | |
|---|---|---|---|---|---|---|
| | 1 | 2 | 3 | 4 | 5 | 6 |
| E1 | 2.47 | \| ← 1.02–1.87 → \| | | | — | — |
| E2 | 7.54 | 7.26 | — | — | — | — |
| E3 | 5.40 | 3.52, 4.23 | 2.10 | — | — | — |
| E4 | — | — | — | — | — | — |
| E5 | 7.86 | 7.19 | 2.57 | \| ← 1.03–1.91 → \| | | |
| E6 | 7.86 | 6.98 | — | — | — | — |
| E7 | 2.46 | \| ← 0.98–2.13 → \| | | | — | — |

Example 8

The above-synthesized optically active compounds (E1 to E7) were measured for HTPs and wavelength shifts.

To a nematic liquid crystal (ZLI-1565) supplied by Merck & Co., Inc., was added a predetermined amount of each of the optically active compounds (E1 to E7) obtained in Examples 1 to 7, to prepare chiral nematic (N*) liquid crystal compositions.

Each of the thus-prepared liquid crystal compositions was measured for an upper-limit temperature of the N* phase thereof and selective reflection behaviors, and helical twisting powers (HTP) and wavelength shifts thereof were determined on the basis of the selective reflection behaviors.

The upper-limit temperature of the N* phase was determined by observation through a polarizing microscope.

Further, the selective reflection behaviors were measured according to the following procedures. A liquid crystal cell with ITO electrodes (cell thickness 10 μm) was charged with the above-prepared liquid crystal composition in an isotropic state. The cell was adjusted to 60° C., a rectangular wave voltage of ±60 V was applied for approximately 1 minute, and the cell was rapidly cooled to room temperature to attain planar alignment.

The above liquid crystal cell was evaluated for selective reflection behaviors at 25° C. and 60° C. with an automatic spectrophotometer. HTPs at 25° C. and 60° C. were calculated on the basis of the following expressions.

$$HTP\ (\mu m^{-1}) = n/(\lambda_{25} \times C/100)$$

$$HTP\ (\mu m^{-1}) = n/(\lambda_{60} \times C/100)$$

wherein n is a refractive index of the chiral nematic liquid crystal, $\lambda_{25}$ is a selective reflection wavelength (μm) at 25° C., $\lambda_{60}$ is a selective reflection wavelength (μm) at 60° C., and C is a concentration (wt %) of the optically active compound. As a refractive index n, there was employed a value of 1.6 that ZLI-1565 as a base liquid crystal had.

The wavelength shift was determined on the basis of the following expression.

$$\text{Wavelength shift (nm)} = \lambda_{60} - \lambda_{25}$$

wherein $\lambda_{60}$ and $\lambda_{25}$ are as defined above except that the unit for each is nm.

Table 3 shows the results. It is seen that the optically active compounds of Examples have a large HTPs of more than 50.

Comparative Example 1

Liquid crystal compositions containing known optically active compounds CB15, CN and S811, repectively, were measured for upper-limit temperatures of their N* phases, and their HTPs and wavelength shifts were determined on the basis of selective reflection behaviors, in the same manner as in Example 8. Table 3 also shows the results.

Referential Example 1

Use of 4-((R)-1-methyl-3-ethylpentyloxycarbonyl)biphenyl=4'-((R)-1-methyl-3-ethylpentyloxycarbonyl)benzoate having the following structure

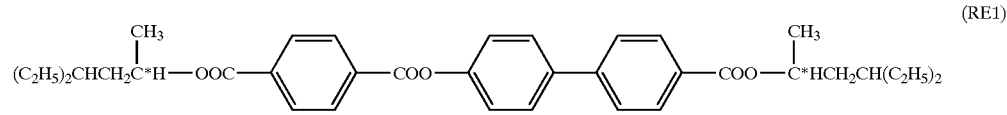
(RE1)

The above compound was measured by DSC to show a melting point of 53° C.

Further, a liquid crystal composition containing the above optically active compound (RE1) was prepared in the same manner as in Example 8. And, it was measured for an upper-limit temperature of its N* phase, and its HTP and wavelength shift were determined on the basis of selective reflection behaviors, in the same manner as in Example 8. Table 3 also shows the results.

TABLE 3

| Compound | Amount (wt %) | Iso-N* (° C.) | HTP (1/μm) | Wavelength shift (nm) |
|---|---|---|---|---|
| E1 | 5 | 83 | 77 | 28 |
| E2 | 5 | 83 | 77 | 41 |
| E3 | 5 | 83 | 73 | 32 |
| E4 | 5 | 82 | 53 | 131 |
| E5 | 5 | 88 | 69 | −26 |
| E6 | 5 | 84 | 74 | 9 |
| E7 | 5 | 84 | 71 | 12 |
| CB15 | 15 | 74 | 8 | 139 |
| CN | 30 | 82 | 5 | 34 |
| S811 | 15 | 73 | 10 | 7 |
| RE1 | 10 | 81 | 16.9 | −128 |

Note)
Iso-N* shows a phase-transfer temperature (upper-limit temperature of N* phase) from an isotropic phase to a chiral nematic phase.

Example 9

To a nematic liquid crystal (ZLI-1565) supplied by Merck & Co., Inc., were added 2.5% by weight of the optically active compound (E1) obtained in Example 1 and 5.7% by weight of the optically active compound (RE1) obtained in Referential Example 1, to prepare a chiral nematic (N*) liquid crystal composition.

The upper-limit temperature of N* phase of the liquid crystal composition and the helical twisting power (HTP) and wavelength shift of the liquid crystal composition were determined in the same manner as in Example 8. Table 4 shows the results. Further, Table 5 shows a change in selective reflection wavelength from 25° C. to 60° C.

The composition containing the optically active compound (E1) and the optically active compound (RE1) has a large HTP of 37.1, and further, the obtained chiral nematic liquid crystal composition showed a wavelength shift of 0 nm. Further, the change in selective reflection wavelength depending upon temperatures from 25° C. to 60° C. was 2 nm at most.

TABLE 4

| | Iso-N* (° C.) | HTP (1/μm) | Wavelength shift (nm) |
|---|---|---|---|
| Example 9 | 80 | 37.1 | 0 |

Note)
Iso-N* shows a phase-transfer temperature (upper-limit temperature of N* phase) from an isotropic phase to a chiral nematic phase.

TABLE 5

| Temperature (° C.) | Selective reflection wavelength (nm) |
|---|---|
| 25 | 524 |
| 40 | 522 |
| 50 | 522 |
| 60 | 524 |

What is claimed is:

1. An optically active compound of the general formula (1),

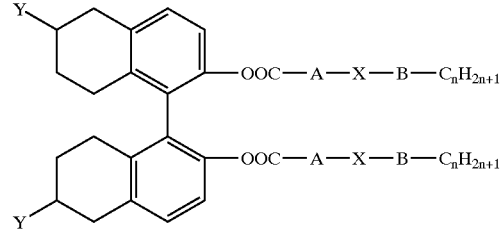

(1)

wherein n is an integer of 1 to 10, Y is a hydrogen atom, an alkyl group having 1 to 5 carbon atoms, a phenyl group, a phenyl group substituted with an alkyl group having 1 to 5 carbon atoms or a phenyl group substituted with an alkoxy group having 1 to 4 carbon atoms, X is a single bond (—), —OOC— or —OCH$_2$—, and each of A and B represents a group or a bond defined in the following (1) to (3), (1) when X is a single bond (—), A is -Cy-, -Ph-, -Py or -Np-, and when A is -Cy-, B is a single bond, -Cy- or -Ph-Z-, when A is -Ph-, B is a single bond, —O—, -Cy-, -Ph-Z-, -Pyr-Z-, -Di-, -Ph-Cy-, -Ph-Ph-Z-, -Ph-Pyr-Z- or -Pyr-Ph-Z-, when A is -Py-, B is -Ph-Z-, or when A is -Np-, B is a single bond or —O—, (2) when X is —OOC—, A is -Ph-, -Np- or -Ph-Ph-, and when A is -Ph-, B is -Cy-, -Ph-Z-, —Np-Z-, -Cy-Cy-, -Py-Ph-Z-, -Ph-Cy-, -Ph-Ph-Z-, -Ph-Di-, -Ph-Pyr-Z-, -Cy-Ph-Z-, -Ph-OOC-Cy- or -Ph-OOC-Ph-Z-, or when A is -Np- or -Ph-Ph-, B is -Cy- or -Ph-Z-, and (3) when X is —OCH$_2$—, A is -Ph-, -Np- or -Ph-Ph-, and when A is -Ph-, B is -Cy-, -Ph-Z-, —Np-Z-, -Cy-Cy-, -Py-Ph-Z-, -Ph-Cy-, -Ph-Ph-Z-, -Ph-Di- or -Ph-Pyr-Z-, or when A is —Np or -Ph-Ph-, B is -Cy- or -Ph-Z-, in which Z is a single bond (—) or —O—, and -Ph-, -Cy-, —OOC—, -Py-, -Pyr-, -Di- and -Np- represent the following structures, provided that one hydrogen atom of -Ph- may be replaced with methyl, a fluorine atom or a chlorine atom.

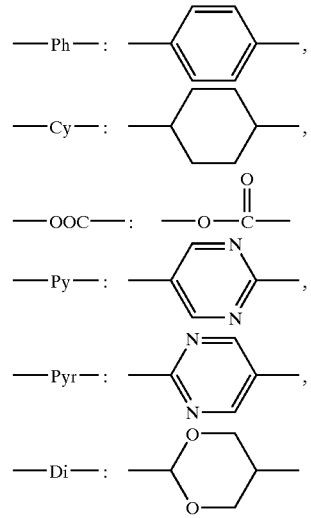

—Np—: 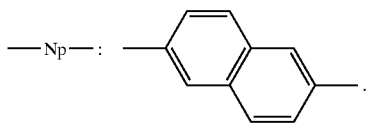

2. The optically active compound of claim 1, which has the general formula (1) in which Y is a hydrogen atom.

3. The optically active compound of claim 1, which has the general formula (1) in which n is an integer of 3 to 8.

4. The optically active compound of claim 1, which has the general formula (1) in which X is a single bond (—).

5. The optically active compound of claim 1, which has the general formula (1) in which X is —OOC—.

6. The optically active compound of claim 1, which has the general formula (1) in which A is -Ph-.

7. The optically active compound of claim 1, which has the general formula (1) in which B is -Ph-Z-, -Cy-, -Di-, —O— or -Ph-Cy-.

8. The optically active compound of claim 1, which has a helical twisting power (HTP) of 50 or more.

9. A chiral dopant of the general formula (1) recited in claim 1 for a nematic liquid crystal.

10. A nematic liquid crystal composition containing at least one of optically active compounds of the general formula (1) recited in claim 1.

11. A liquid crystal display device having the nematic liquid crystal composition recited in claim 10 interposed between substrates having an electrode each.

* * * * *